(12) United States Patent
Rausch

(10) Patent No.: US 6,996,419 B1
(45) Date of Patent: Feb. 7, 2006

(54) CONSOLIDATING SIGNALS FOR AN ANTENNA SYSTEM

(75) Inventor: Walter F. Rausch, Shawnee, KS (US)

(73) Assignee: Sprint Communications Company L.P., Overland Park, KS (US)

(*) Notice: Subject to any disclaimer, the term of this patent is extended or adjusted under 35 U.S.C. 154(b) by 535 days.

(21) Appl. No.: 10/151,227

(22) Filed: May 20, 2002

(51) Int. Cl.
H04B 1/38 (2006.01)

(52) U.S. Cl. .............. 455/562.1; 455/575.7; 455/90.3; 333/24 R; 333/1.1

(58) Field of Classification Search .......... 455/562.1, 455/561, 575.7, 115.1, 82, 13.3, 19, 129, 455/269, 280, 307, 78, 423, 424, 425, 575.1, 455/550.1, 133, 193.1, 334, 344, 273, 291, 455/83; 343/890, 891, 893, 853, 876, 852; 330/65, 295, 305; 333/24 R, 1.1, 100, 124, 333/125, 126, 129, 132, 134, 136
See application file for complete search history.

(56) References Cited

U.S. PATENT DOCUMENTS

| | | | | |
|---|---|---|---|---|
| 5,315,304 A | * | 5/1994 | Ghaleb et al. | 342/165 |
| 5,604,925 A | * | 2/1997 | O'Malley et al. | 455/254 |
| 5,768,690 A | * | 6/1998 | Yamada et al. | 455/78 |
| 6,594,508 B1 | * | 7/2003 | Ketonen | 455/561 |
| 2001/0044323 A1 | * | 11/2001 | Waylett | 455/561 |
| 2002/0097191 A1 | * | 7/2002 | Harel et al. | 343/890 |

FOREIGN PATENT DOCUMENTS

DE  0 991 198 A2 * 5/2000

* cited by examiner

Primary Examiner—Edward F. Urban
Assistant Examiner—Charles Chow

(57) ABSTRACT

A communication system that includes an antenna system and a consolidation system is provided. The consolidation system has a first terminal and a second terminal. The second terminal is connected to the antenna system. The consolidation system transfers a first signal from the first terminal through the second terminal to the antenna system. The antenna system transmits the first signal. The antenna system also receives a second signal. The consolidation system transfers and amplifies the second signal from the antenna system through the second terminal to the first terminal.

23 Claims, 6 Drawing Sheets

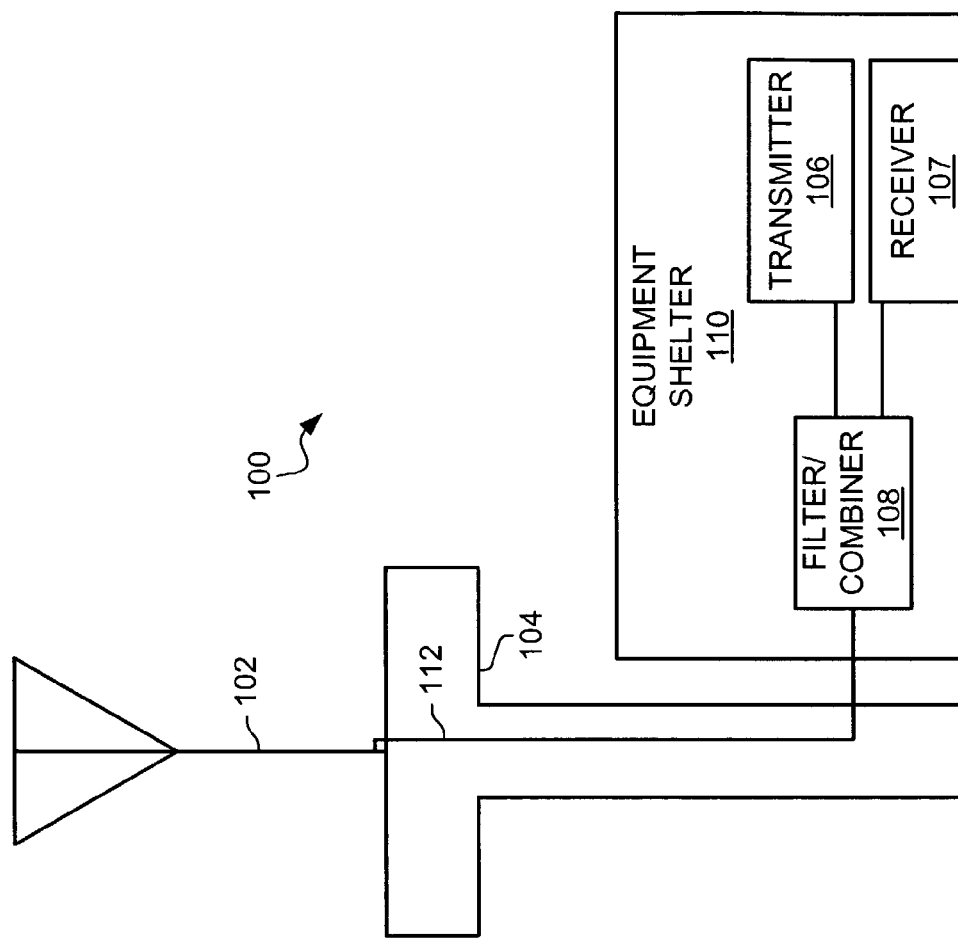

CONSOLIDATING SIGNALS FOR AN ANTENNA SYSTEM

BACKGROUND OF THE INVENTION

1. Field of the Invention

This invention relates to the field of telecommunications and in particular to antenna systems and operational methods.

2. Description of the Prior Art

Antennas are used to receive and transmit signals that comprise electromagnetic waveforms. In many instances, a single antenna is used to either receive or transmit an individual signal. A single antenna can be configured to simultaneously transmit and receive signals. A current practice for combining transmit and receive capabilities into a single antenna includes using a filter/combiner. An example of a filter/combiner includes radio frequency (RF) circuitry that combines a received signal with a transmitted signal into a single antenna feed line and filters the received signal.

The current practice of using a filter/combiner requires mounting the filter/combiner either at a base of an antenna platform or directly behind an antenna. When located at the base of the antenna platform, a number of coaxial cables providing antenna feed lines is reduced. However, locating the filter/combiner at the base of the antenna platform precludes advantages of a Low Noise Amplifier (LNA) mounted directly behind the antenna. The advantages of an LNA mounted directly behind the antenna include amplification of a signal that is received by the antenna.

An LNA can be used if the filter/combiner is mounted directly behind the antenna. However, mounting the filter/combiner directly behind the antenna increases a number of antenna feed lines. For example, a first coaxial cable from the antenna to a receiver in an equipment shelter provides reception capabilities and a second coaxial cable from a transmitter in the equipment shelter provides transmission capabilities.

Combining reception and transmission capabilities into a single antenna reduces a number of antennas in a communication system. Reducing the number of antennas is advantageous as it reduces costs associated with purchases and designs of the antennas. Reducing the number of antennas also reduces a physical load placed on an antenna support structure. Unfortunately, the prior solutions of combining reception and transmission capabilities either do not take advantage of an LNA or increase a number of antenna feed lines.

SUMMARY OF THE SOLUTION

The inventions help solve the above problem and others by providing a communication system that includes an antenna system and a consolidation system. The consolidation system has a first terminal and a second terminal. The second terminal is connected to the antenna system. The consolidation system transfers a first signal from the first terminal through the second terminal to the antenna system. The antenna system then transmits the first signal. The antenna system also receives a second signal. The consolidation system transfers and amplifies the second signal from the antenna system through the second terminal to the first terminal.

In some embodiments, the consolidation system comprises a signal circulator system. The signal circulator system receives the first signal and transfers the first signal to the antenna system. The signal circulator system also receives the second signal from the second terminal and transfers the second signal to the first terminal. In some embodiments, the signal circulator system includes a four-port radio frequency (RF) circulator. In some embodiments, the consolidation system includes a filter. The filter suppresses signals other than the second signal. In some embodiments, the consolidation system includes an amplifier. The amplifier is configured to amplify the second signal from the filter. In some embodiments, the amplifier is an LNA.

In other embodiments, the communication system comprises an interface system. The interface system is connected to the first terminal of the consolidation system. The interface system is configured to transmit the first signal to the consolidation system. The interface system is also configured to receive the second signal from the consolidation system. The interface system is also configured to monitor the first signal and the second signal. In some embodiments, the interface system comprises a monitor system. The monitor system is configured to monitor the first signal and the second signal. In other embodiments, the interface system comprises a filter/combiner that is connected to the monitor system. In some embodiments, the interface system comprises a receiver system and/or a transmitter system. The transmitter system is connected to the filter/combiner and configured to transmit the first signal. The receiver system is also connected to the filter/combiner and configured to receive the second signal.

In some embodiments the monitor system comprises a network monitor, a power inserter, and a signal suppressor. The network monitor is configured to monitor power fluctuations in the first signal and the second signal. The power inserter is connected to the network monitor. The signal suppressor is connected to the power inserter and configured to suppress signal amplification.

In other embodiments the communication system comprises a power inserter and a signal suppressor. In some embodiments, the power inserter is connected to the consolidation system and the signal suppressor is connected to the power inserter. The signal suppressor is also configured to suppress signal amplification. In other embodiments, the communication system includes a signal suppressor connected to the antenna system.

Advantages of the following embodiments include reducing a number of antennas for transmitting and/or receiving by consolidating transmission and reception capabilities of an antenna. Other advantages include decreasing a number of cables needed to connect an antenna to associated equipment. Other advantages include decreasing a physical load placed on an antenna platform due to the reduction of a number of antennas.

DESCRIPTION OF THE DRAWINGS

FIG. 1A illustrates a communication system in the prior art.

The same reference number represents the same element on all drawings.

DETAILED DESCRIPTION OF THE DRAWINGS

Figure 1B:
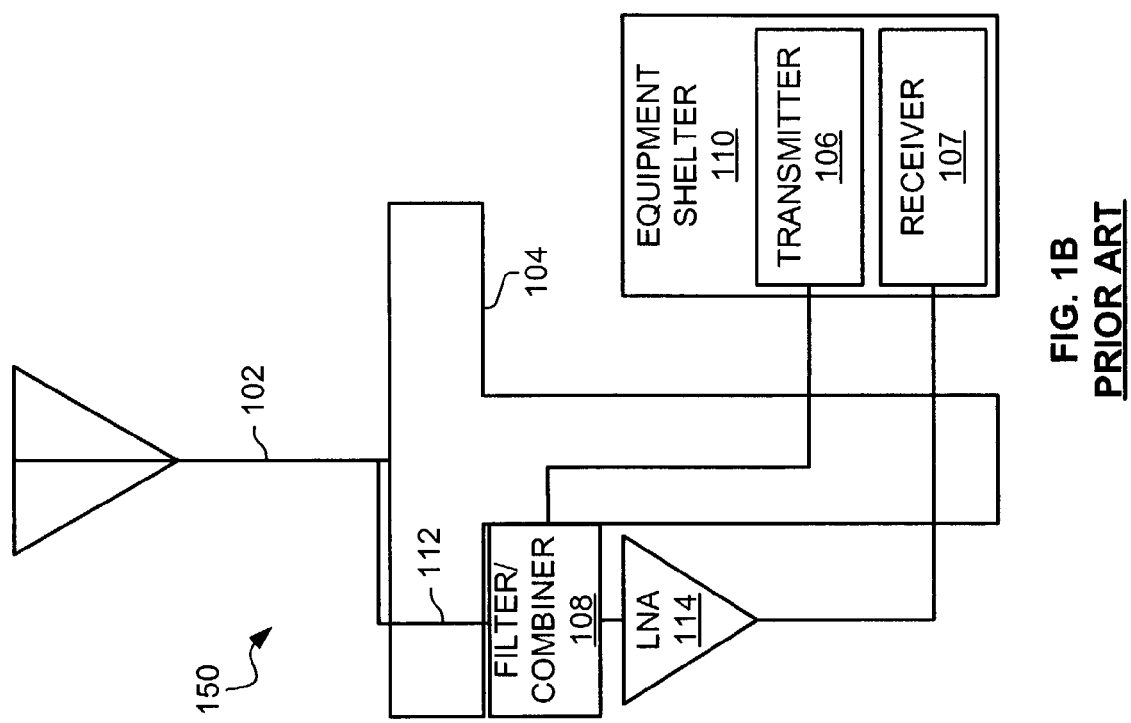
FIG. 1B illustrates a communication system with a low noise amplifier in the prior art.

Prior Art Antenna System—FIGS. 1A–1B

FIG. 1A illustrates a communication system 100 in the prior art. The communication system 100 comprises antenna 102, platform 104, filter/combiner 108, transmitter 106, receiver 107, equipment shelter 110, and feedline connection 112. Antenna 102 is mounted to platform 104. Antenna 102 is connected to filter/combiner 108 via feedline connection 112. Filter/combiner 108 is connected to transmitter 106 and to receiver 107. Filter/combiner 108, transmitter 106, and receiver 107 are enclosed by equipment shelter 110. Feedline connections 112 could include any wire, coaxial cable, or other means of conducting a signal.

Equipment shelter 110 is a physical device that prevents damage to equipment caused by weather. Equipment shelter 110 is not located on platform 104, but rather at the base of platform 104. Transmitter 106 includes any system configured to transmit signals to an antenna. Receiver 107 includes any system configured to receive signals from an antenna.

Filter/combiner 108 is a radio frequency (RF) circuit configured to filter a first signal that is received from an antenna. Filter/combiner 108 is also configured to transfer a second signal to the antenna. Filter/combiner 108 combines the first signal with the second signal into a single antenna feed line. Locating the filter/combiner at the base of the antenna platform precludes advantages of a Low Noise Amplifier (LNA) mounted directly behind the antenna. Advantages of an LNA mounted directly behind the antenna include amplification of a received signal. Platform 104 is any physical structure configured to support an antenna. A signal is any electromagnetic waveform that is either propagated to or from an antenna.

FIG. 1B illustrates another communication system 150 in the prior art. The other communication system 150 comprises antenna 102, platform 104, transmitter 106, receiver 107, filter/combiner 108, equipment shelter 110, feedline connection 112, and Low Noise Amplifier (LNA) 114. Antenna 102 is mounted to platform 104. Antenna 102 is connected to filter/combiner 108. Filter/combiner 108 is connected to LNA 114. Filter/combiner 108 is also connected to transmitter 106. LNA 114 is connected to receiver 107. Transmitter 106 and receiver 107 are enclosed by equipment shelter 110.

LNA 114 includes any circuit configured to amplify a signal. Again, equipment shelter 110 is not located on platform 104 but rather at the base of platform 104. An LNA 114 can be used if the filter/combiner 108 is mounted directly behind the antenna 102. However, mounting the filter/combiner 108 directly behind the antenna 102 increases a number of antenna feed lines. As shown, a first coaxial cable from LNA 114 to receiver 107 provides reception capabilities. A second coaxial cable from transmitter 106 to filter/combiner 108 provides transmission capabilities.

Figure 2:
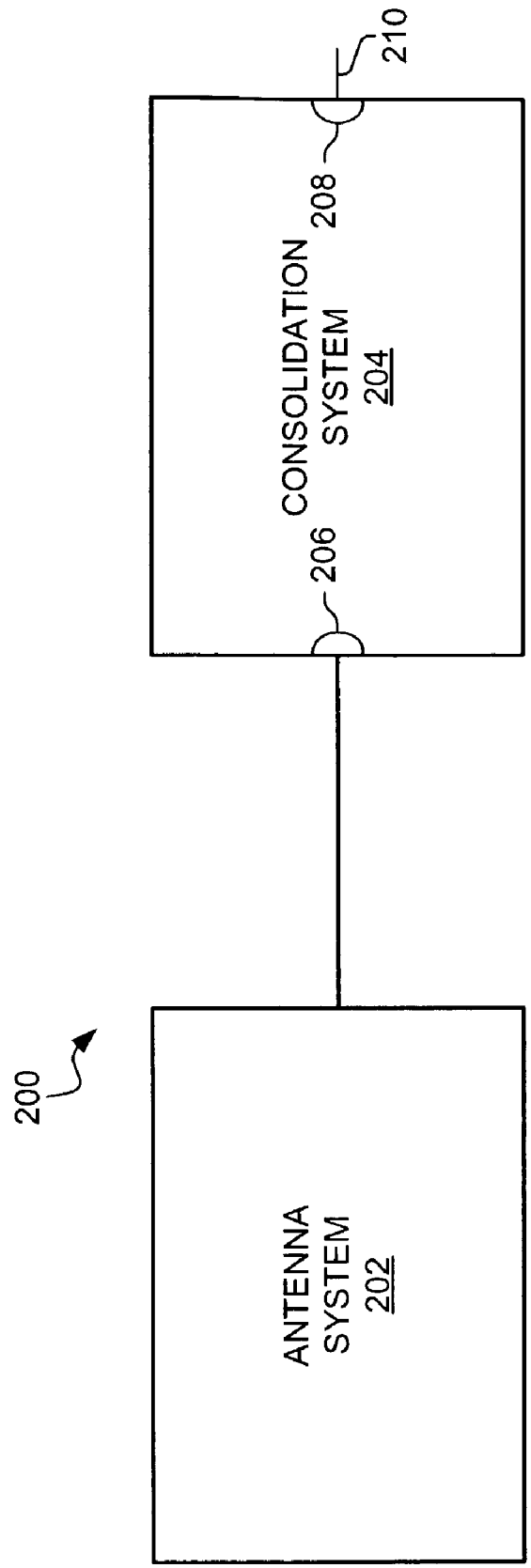
FIG. 2 illustrates a communication system in an example of the invention.
Figure 3:
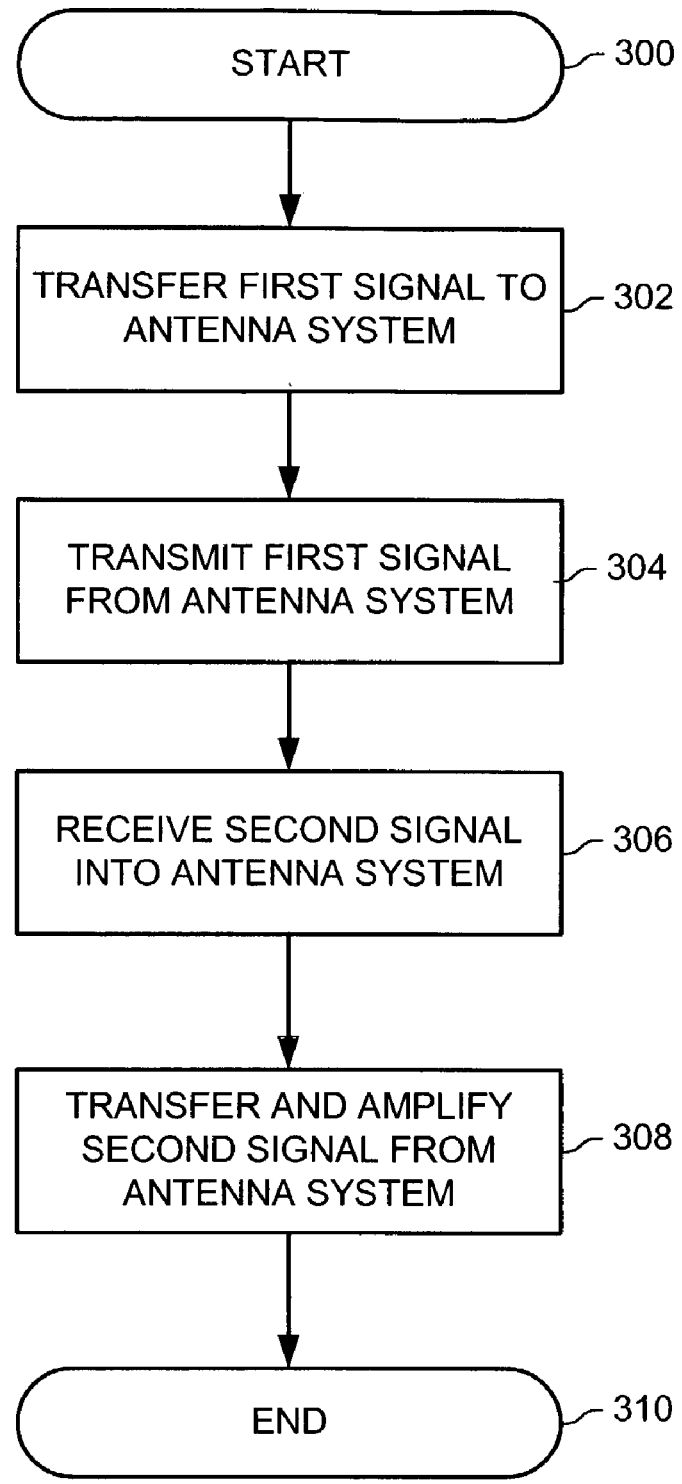
FIG. 3 illustrates a flow chart of the operation of the communication system in an example of the invention.

Communication System—FIGS. 2–3

FIG. 2 illustrates communication system 200 in an example of the invention. Communication system 200 comprises antenna system 202 and consolidation system 204. Consolidation system 204 comprises terminal 206 and terminal 208. Antennas system 202 is connected to terminal 206. Terminal 208 is connected to connection 210.

Antenna system 202 includes any structure or device configured to receive and/or transmit signals. One example of antenna system 202 includes an antenna. Consolidation system 204 includes any system configured to transfer a first signal from terminal 208 through the terminal 206 to antenna system 202 and transfer and amplify a second signal from antenna system 202 through terminal 206 to terminal 208. Terminal 206 and 208 are any ports or endpoints that connections, wires, or cable are connected to. Based on this disclosure, those skilled in the art will know how to make and use communication system 200.

FIG. 3 illustrates a flow chart of the operation of communication system 200 in an example of the invention. FIG. 3 begins in step 300. Consolidation system 204 transfers the first signal from terminal 208 through terminal 206 to antenna system 202 in step 302. Antenna system 202 transmits the first signal in step 304. Antenna system 202 receives a second signal in step 306. In step 308; consolidation system 204 transfers and amplifies a second signal from antenna system 202 through terminal 206 to terminal 208. FIG. 3 ends in step 310. Based on this disclosure, those skilled in the art will appreciate how to modify existing communication systems that transfer a first signal from a first terminal through a second terminal to an antenna system and transfer and amplify a second signal from the antenna system through the second terminal to the first terminal.

Figure 4:
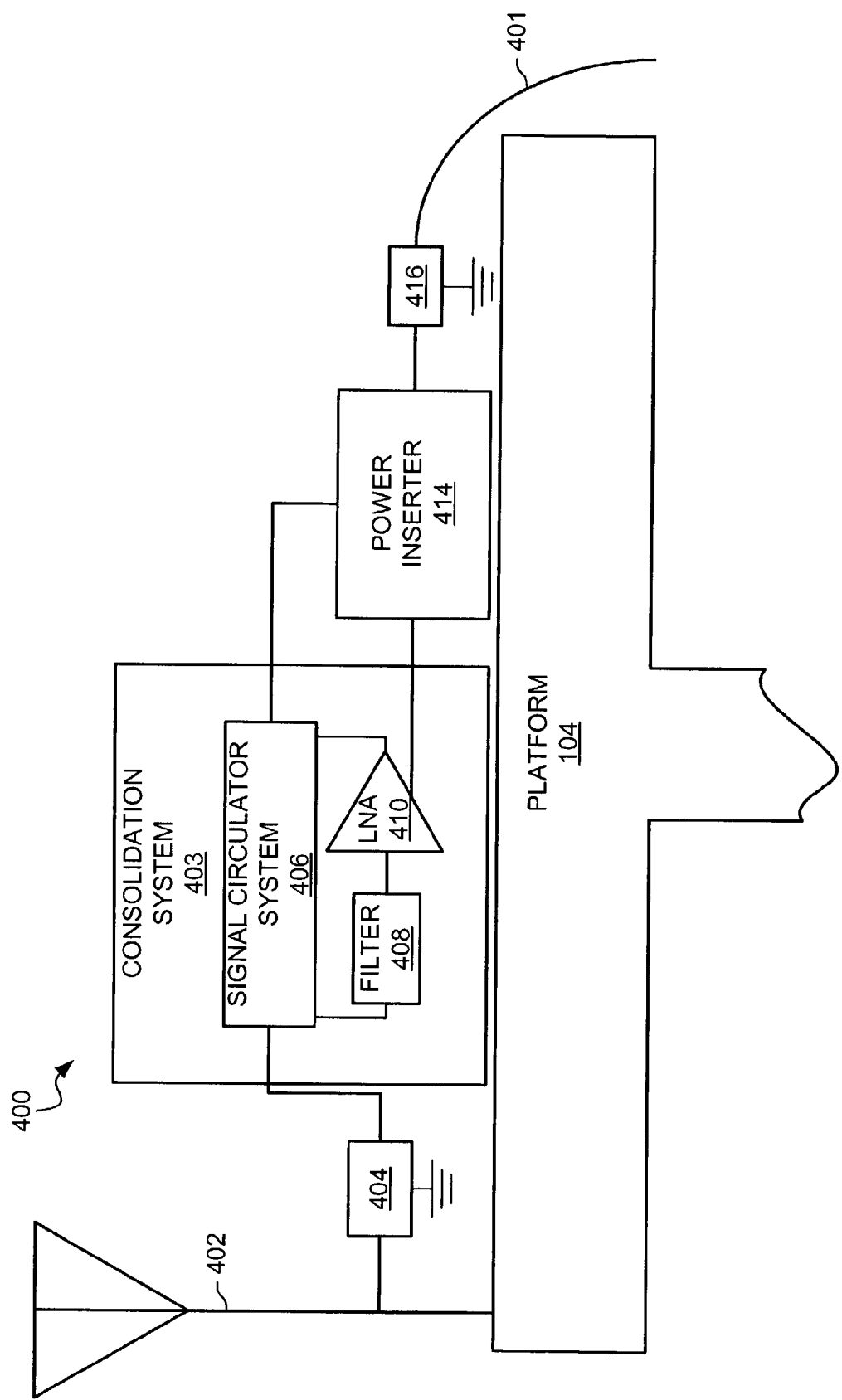
FIG. 4 illustrates a communication system that includes a Low Noise Amplifier (LNA) in an example of the invention.
Figure 5:
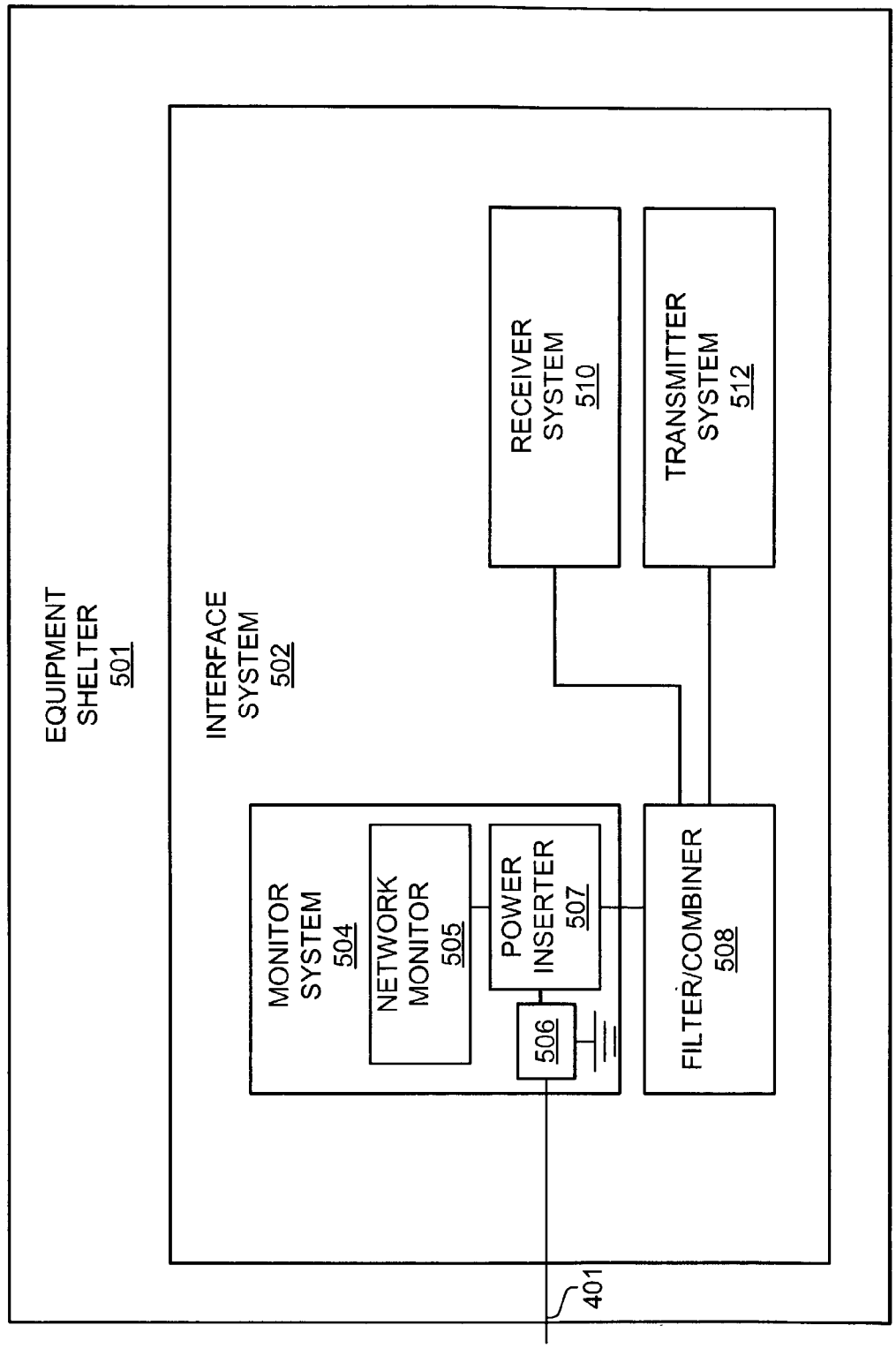
FIG. 5 illustrates an interface system enclosed in an equipment shelter in an example of the invention.

Communication System with Low Noise Amplifier—FIGS. 4–5

FIGS. 4–5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 4 illustrates communication system 400 in an example of the invention. Communication system 400 comprises antenna 402, consolidation system 403, lightning suppressor 404, platform 104, connection 401, lightning suppressor 416, and power inserter 414. Consolidation system 403 comprises signal circulator system 406, filter 408, and LNA 410. Antenna 402, consolidation system 403, lightning suppressor 404, lightning suppressor 416, and power inserter 414 are mounted to the top of platform 104.

Antenna 402 is connected to lightning suppressor 404. Lightning suppressor 404 is connected to signal circulator system 406 at a second terminal of signal circulator system 406. Signal circulator system 406 is connected to filter 408. Filter 408 is connected to LNA 410. LNA 410 is connected to signal circulator system 406. LNA 410 is also connected to power inserter 414. The first terminal of signal circulator system 406 is also connected to power inserter 414. Power inserter 414 is connected to lightning suppressor 416. Lightning suppressor 416 is connected to feedline connection 401. Feedline connection 401 could include any wire, coaxial cable, or other means of conducting a signal.

Signal circulator system 406 includes any system configured to transfer a first signal to an antenna 402 from a second first terminal to a second terminal receive a second signal from the antenna 402 into a second terminal, transfer the second signal to the filter 408, and transfer the second signal from the LNA 410 to the first terminal. One example of signal circulator system 406 includes a four-port RF circulator for the 2.50 Hz to 2.9 GHz range. Filter 408 includes any device or system configured to suppress signals other than the second signal. One example of filter 408 is a passband filter. Power inserter 414 includes any device configured to insert DC power into a signal. A lightning suppressor, such as lightning suppressors 416 and 404, includes any device configured to suppress signal amplification due to lightning. LNA 410 is any device configured to amplify the second signal from filter 408. LNA 410 receives DC power from power inserter 414.

FIG. 5 illustrates interface system 502 enclosed in equipment shelter 501 in an example of the invention. Equipment shelter 501 is located at a base of an antenna platform. Interface system 502 comprises monitor system 504, filter/combiner 508, receiver system 510, and transmitter system 512. Monitor system 504 includes power inserter 507, lightning suppressor 506, and network monitor 505. Feedline connection 401 is connected to lightning suppressor 506. Lightning suppressor 506 is connected to power inserter 507. Power inserter 507 is connected to network monitor 505 and filter/combiner 508. Filter/combiner 508 is connected to receiver system 510 and to transmitter system 512.

Monitor system 504 includes any circuit or computer system configured to monitor a first signal and a second signal. Transmitter system 512 includes any circuit or computer system configured to transmit a signal. Receiver system 510 includes any circuit or computer system configured to receive a signal. Network monitor 505 includes any circuit or computer system configured to monitor power fluctuations in a first signal and a second signal. Examples of network monitor 505 include network analyzers, spectrum analyzers, oscilloscopes, or any other device that monitors signal power. In one embodiment, the antenna 402 transmits and receives signals in a fixed wireless communication system. In another embodiment, the antenna 402 transmits and receives signals in the Multichannel Multipoint Distribution Service (MMDS) frequency range.

Advantages of the following embodiments include reducing a number of antennas for transmitting and/or receiving by consolidating transmission and reception capabilities of an antenna. Other advantages include decreasing a number of cables needed to connect an antenna to associated equipment. Other advantages include decreasing a physical load placed on an antenna platform due to the reduction of a number of antennas. Also, signals from an antenna are advantageously amplified to improve receipt and processing of signals from an antenna. More specifically, amplification overcomes cable losses and improves receiver noise figures. In some embodiments, another advantage is the filter/combiner can remain in the equipment shelter, while benefiting from an LNA adjacent to the antenna.

We claim:

1. A communication system, the communication system comprising:
    an antenna system configured to transmit a first signal and receive a second signal; and
    a consolidation system having a first terminal and a second terminal, wherein the second terminal is connected to the antenna system and the consolidation system is configured to transfer the first signal from the first terminal through the second terminal to the antenna system and configured to transfer and amplify the second signal from the antenna system through the second terminal to the first terminal;
    wherein the consolidation system comprises:
        an amplifier configured to amplify the second signal; and
        a four-port signal circulator comprising a first port coupled to the first terminal, a second port coupled to the second terminal, and a third port and a fourth port coupled to the amplifier.

2. The communication system of claim 1 wherein the four-port signal circulator comprises a radio frequency (RF) circulator.

3. The communication system of claim 1 wherein the consolidation system further comprises a filter configured to suppress signals other than the second signal.

4. The communication system of claim 1 wherein the amplifier comprises a Low Noise Amplifier (LNA).

5. The communication system of claim 1 further comprising an interface system connected to the first terminal of the consolidation system and configured to transmit the first signal to the consolidation system, receive the second signal from the consolidation system, and monitor the first signal and the second signal.

6. The communication system of claim 5 wherein the interface system comprises a monitor system configured to monitor the first signal and the second signal.

7. The communication system of claim 6 wherein the monitor system comprises:
    a network monitor configured to monitor power fluctuations in the first signal and the second signal;
    a power inserter connected to the network monitor; and
    a signal suppressor connected to the power inserter and configured to suppress signal amplification.

8. The communication system of claim 6 wherein the interface system further comprises a filter/combiner connected to the monitor system.

9. The communication system of claim 8 wherein the interface system further comprises a transmitter system connected to the filter/combiner and configured to transmit the first signal.

10. The communication system of claim 8 wherein the interface system further comprises a receiver system connected to the filter/combiner and configured to receive the second signal.

11. The communication system of claim 1 further comprising a power inserter connected to the consolidation system.

12. The communication system of claim 11 further comprising a signal suppressor connected to the power inserter and configured to suppress signal amplification.

13. The communication system of claim 1 further comprising a signal suppressor connected to the antenna system and to the consolidation system and configured to suppress signal amplification.

14. A method of operating a communication system, the method comprising:
    transferring a first signal from a first terminal through a second terminal to an antenna system;
    transmitting the first signal from the antenna system;
    receiving a second signal into the antenna system;
    transferring the second signal from the antenna system through the second terminal to the first terminal; and
    amplifying the second signal;
    wherein transferring the first signal from the first terminal through the second terminal and transferring the second signal from the antenna system through the second terminal to the first terminal are accomplished by way of a four-port signal circulator wherein amplifying the second signal is accomplished by connecting an amplifier to a third and a fourth port of the four-port signal circulator.

15. The method of claim 14 further comprising filtering the second signal.

16. The method of claim 14 wherein amplifying is performed by a Low Noise Amplifier (LNA).

17. The method of claim 16 wherein the LNA is located with the antenna system on a platform.

18. The method of claim 14 further comprising monitoring power fluctuations in the first signal.

19. The method of claim 14 further comprising monitoring power fluctuations in the second signal.

20. The method of claim 14 further comprising suppressing signal amplification in the first signal and the second signal.

21. The method of claim 14 further comprising inserting power into the first signal.

22. The method of claim 14 further comprising inserting power into the second signal.

23. The method of claim 14 further comprising enclosing a filter/combiner in a shelter located at a base of a platform to reduce an amount of cable.

* * * * *